J. CUPER.
DIRECTION INDICATOR.
APPLICATION FILED JUNE 18, 1921.
1,398,715.
Patented Nov. 29, 1921.
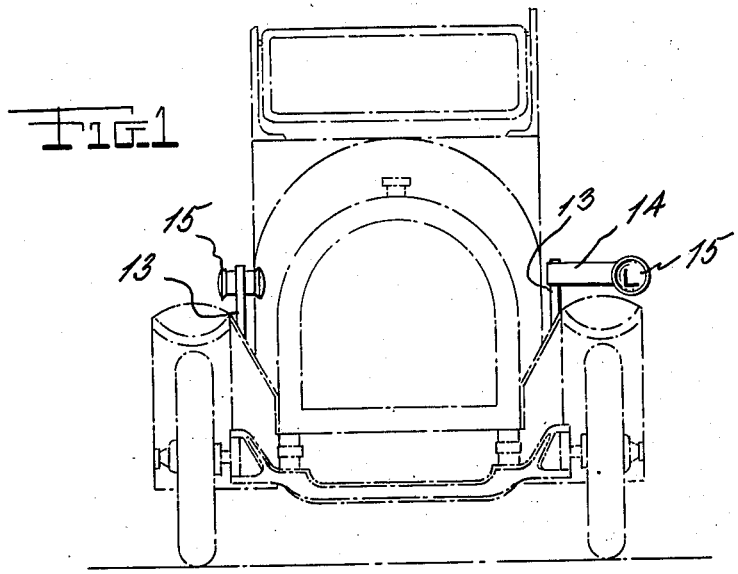
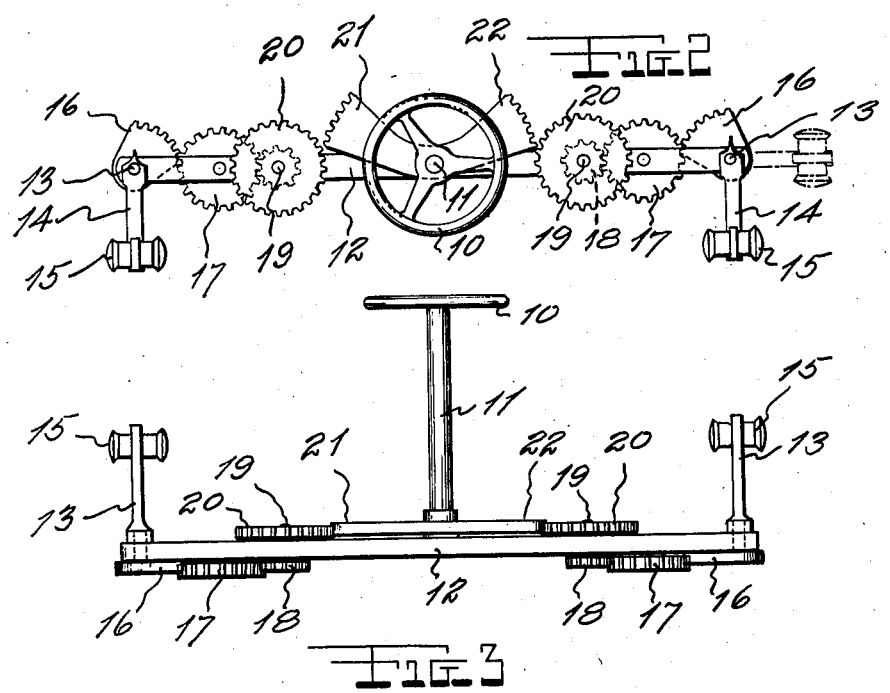
INVENTOR
John Cuper
ATTORNEY

UNITED STATES PATENT OFFICE.

JOHN CUPER, OF NEFFS, OHIO.

DIRECTION-INDICATOR.

1,398,715.

Specification of Letters Patent.  Patented Nov. 29, 1921.

Application filed June 18, 1921. Serial No. 478,759.

*To all whom it may concern:*

Be it known that I, JOHN CUPER, a citizen of the United States, residing at Neffs, in the county of Belmont and State of Ohio, have invented certain new and useful Improvements in Direction-Indicators, of which the following is a specification.

This invention relates to improvements in direction indicators for motor vehicles and has for its principal object to provide an automatic means to indicate to pedestrians, vehicles and others the intention of the driver.

Another object of the device is to provide a signal which will be visible after dark as well as during daytime.

With these and other objects in view the invention consists in the novel construction, combination and arrangement of parts which will be fully set forth in the following specification, claimed and illustrated in the accompanying drawing, in which, Figure 1 is a view showing this improved signaling means applied to a vehicle, Fig. 2 is a top plan view of the device, and Fig. 3 is a side view of Fig. 2.

Referring to the drawings in detail, the numeral 10 designates the steering wheel of a vehicle, which is mounted on the usual steering post 11 in the customary manner. Near the lower end of the steering post is a transversely extending supporting bar 12 having pivotally mounted at opposite ends standards 13 which are provided at their upper ends with horizontal extending targets 14 carrying suitable illuminating means such as lamps 15.

Toothed segments 16 are secured to the lower ends of the standards 13 and mesh with gears 17 which in turn mesh with pinions 18 at the lower end of a shaft 19 which is journaled in said bar 12. A gear 20 is secured to the upper end of each shaft 19 and it will be obvious that when the gear 20 is rotated, movement will be imparted through the gear train to its respective standard and target to move the same into indicating position.

In order that the signal may be automatically given a pair of toothed segments 21 and 22 are secured to the steering post 11 and are so arranged as to alternately engage the gears 20, according to the direction of rotation of the steering wheel.

In operation it will be seen that when the steering wheel is turned to the right in Fig. 2 the segment 22 will move into engagement with the right-hand gear 20 and drive the same, while the segment 21 will move away from the left-hand gear 20, thus permitting the same and its associated parts to remain idle. Obviously when the steering wheel is turned to the left, the reverse operation will take place and the left-hand signal will be thrown into view.

While in the foregoing there has been shown and described the preferred embodiment of this invention, it is to be understood that certain minor changes, in the details of construction, combination and arrangement of parts may be resorted to without departing from the spirit and scope of the invention as claimed.

What is claimed is:—

In a device of the class described, the combination with the steering mechanism of a vehicle, of a supporting bar, opposed gear trains carried by the bar, a signaling means mounted at each end of the bar and adapted to be operated by the gear trains, and a pair of toothed segments radiating from the steering mechanism in such position as to alternately operate said gear trains when the steering mechanism is rotated.

In witness whereof I affix by signature.

JOHN CUPER.